United States Patent
Rakshit et al.

(10) Patent No.: US 10,580,144 B2
(45) Date of Patent: Mar. 3, 2020

(54) METHOD AND SYSTEM FOR TRACKING HOLOGRAPHIC OBJECT

(71) Applicant: International Business Machines Corporation, Armonk, NY (US)

(72) Inventors: Sarbajit K. Rakshit, Kolkata (IN); Eric V. Kline, Rochester, MN (US); Anthony Spielberg, Austin, TX (US); Michael Karl Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 15/826,158

(22) Filed: Nov. 29, 2017

(65) Prior Publication Data

US 2019/0164299 A1    May 30, 2019

(51) Int. Cl.
*G06T 7/00* (2017.01)
*G06T 7/246* (2017.01)
*G06F 3/00* (2006.01)

(52) U.S. Cl.
CPC .... *G06T 7/248* (2017.01); *G06T 2207/30232* (2013.01)

(58) Field of Classification Search
CPC ............ A63F 13/00; G06T 19/00; G06T 7/00
USPC .......................................................... 382/103
See application file for complete search history.

(56) References Cited

U.S. PATENT DOCUMENTS

| | | | |
|---|---|---|---|
| 6,452,665 B1 | 9/2002 | Kikuchi | |
| 7,295,684 B2 | 11/2007 | Tsujino et al. | |
| 8,983,130 B2* | 3/2015 | Yasugi | G01S 13/867 382/103 |
| 9,191,537 B2 | 11/2015 | Miller et al. | |
| 9,202,126 B2 | 12/2015 | Tojo | |
| 9,262,693 B2* | 2/2016 | Kamiya | G06K 9/00993 |
| 2014/0132629 A1 | 5/2014 | Pandey et al. | |
| 2015/0363654 A1 | 12/2015 | Zhao et al. | |
| 2017/0090675 A1* | 3/2017 | Lee | A61B 8/465 |

* cited by examiner

*Primary Examiner* — Abolfazl Tabatabai
(74) *Attorney, Agent, or Firm* — Scully, Scott, Murphy & Presser, P.C.; Tihon Poltavets, Esq.

(57) ABSTRACT

A method, system, and computer product for detecting a virtual object include transmitting a probe signal to objects, receiving an echo signal reflected by at least one object of the objects, generating scan data based on the echo signal, capturing one or more images of the objects, generating image data corresponding to the captured images, computing the scan data to identify each of the objects, computing the image data to identify each of the objects, and determining another object of the objects as a virtual object, responsive to determining that the another object is identified by the computation on the image data and is not identified by the computation on the scan data.

17 Claims, 7 Drawing Sheets

METHOD AND SYSTEM FOR TRACKING HOLOGRAPHIC OBJECT

FIELD

The present disclosure relates to a technique for detecting a holographic object, and more particularly, to a method or system for distinguishing a holographic object from real physical objects and tracking the holographic object.

BACKGROUND

With the development of holographic techniques, holographic images can be implemented to appear to more similar to real physical images, and thus making it hard to distinguish between them. Thus, in various applications such as video surveillance ecosystems, augmented reality systems, etc., a technique for distinguishing holographic objects from real physical objects and tracking them is advantageous.

SUMMARY

In an aspect of the present disclosure, a computer-implemented method for detecting a virtual object is provided. The method includes transmitting a probe signal to objects, receiving an echo signal reflected by at least one object of the objects, generating scan data based on the echo signal, capturing one or more images of the objects, generating image data corresponding to the captured images, computing the scan data to identify each of the objects, computing the image data to identify each of the objects, and determining a first object of the objects as a virtual object, responsive to determining that the first object is identified by the computation on the image data and is not identified by the computation on the scan data.

In an aspect of the present disclosure, a system for detecting a virtual object is provided. The system includes a sensor device, an image capturing device, a processing device, and a memory coupled to the processing device. The sensor device is configured to transmit a probe signal to objects, receive an echo signal reflected by at least one object of the objects, and generate scan data based on the echo signal. The image capturing device is configured to capture one or images of the objects and generate image data corresponding to the captured images. The processing device is configured to receive the scan data and compute the scan data to identify each of the objects, receive the image data and compute the image data to identify each of the objects; and determine a first object of the objects as a virtual object, responsive to determining that the first object is identified by the computation on the image data and is not identified by the computation on the scan data.

In an aspect of the present disclosure, a computer program product comprising a computer readable storage medium having computer readable program instructions embodied therewith is provided. The computer readable program instructions executable by at least one processor to cause a computer to perform a method for detecting a virtual object. The method includes transmitting a probe signal to objects, receiving an echo signal reflected by at least one object of the objects, generating scan data based on the echo signal, capturing one or images of the objects, generating image data corresponding to the captured images, computing the scan data to identify each of the objects, computing the image data to identify each of the objects, and determining a first object of the objects as a virtual object, responsive to determining that the first object is identified by the computation on the image data and is not identified by the computation on the scan data.

DETAILED DESCRIPTION

Figure 1A:
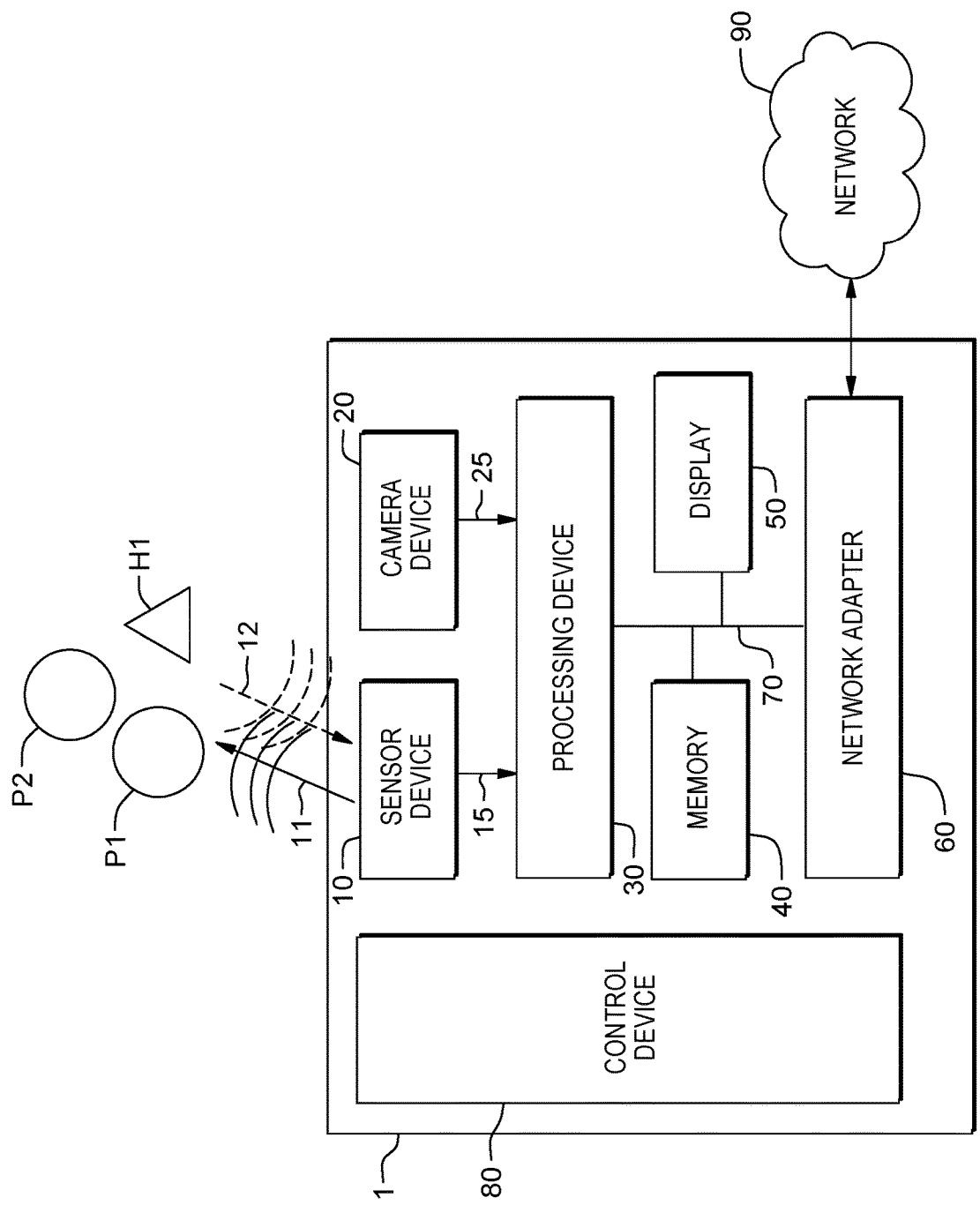
FIG. 1A is an example environment where a holographic object detection system is used to distinguish a holographic object(s) from physical objects in a venue according to an embodiment of the present disclosure.

Embodiments of the present disclosure will now be described in detail with reference to the drawings. However, the following embodiments do not restrict the invention claimed in the claims. Moreover, all combinations of features described in the embodiments are not necessarily mandatory for the architecture of the present invention. Like numbers are assigned to like elements throughout the description of the embodiments of the present invention.

It will be understood that, although the terms first, second, third, etc. may be used herein to describe various elements. However, locations of these elements or orders where the elements are arranged should not be limited by these terms. Instead, these terms are only used to distinguish one element from another element.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this standard, specify the presence of stated features, integers, steps, operations, elements, and/or components, but do not preclude the presence or addition of one or more other features, integers, steps, operations, elements, components, and/or groups thereof.

A holographic object detection system according to an embodiment of the present disclosure enables to distinguish between virtual holographic objects from and real physical objects in a venue and track the holographic objects. In the present disclosure, the term venue may refer to an area at users' interest including one or more objects to be detected. To this end, in one embodiment, the holographic object detection system may have a sensor device embodied with e.g., IR sensors, ultrasound sensors, sonic sensors, etc. to scan the venue together with an image capturing device such as a video or still image camera. Although it is described for only illustrative purpose in the present disclosure that a video surveillance camera is an example of the image capturing device and a video image is an example of images captured by the image capturing device, exemplary embodiments of the present disclosure are not limited thereto. In one embodiment, both the feeds from the sensor device and the video surveillance camera may be compared to determine one or more holographic objects in the venue. For example, an object identified in the video image captured by the video surveillance camera but not identified in the scan image sensed by the sensor device may be determined as a holographic object, given that an electromagnetic (EM) probe signal (e.g., scan signal) transmitted from the sensor device passes through the holographic object without providing a reflected echo signal therefrom.

In one embodiment, the holographic object detection system may distinguish between a holographic object and a physical object by observing whether an object has a shadow or not. For example, if it is seen in the video image that an object has a shadow, the object may be determined as a physical object. If it is seen in the video image that an object has no shadow, the object may be determined as a holographic object. To this end, the holographic object detection system may provide light that is transmitted toward objects in a venue to cast shadows of the objects. In one aspect, the light for casting the shadows can be generated by the sensor device as discussed above, or in another aspect, the light can be provided by a separate light source from the sensor device. In other aspects, the light source may be implemented in the video surveillance camera.

Next, the determined one or more holographic objects may be highlighted in the video image in real time with appropriate tags so that the holographic objects can easily be distinguished from real physical objects. Once the holographic objects are identified, a trigger for causing a variety of actions/responses (e.g., tracking the holographic objects over time and space) may be set.

FIG. 1A is an example environment where a holographic object detection system 1 is used to distinguish a holographic object(s) from physical objects in a venue according to an embodiment of the present disclosure.

Referring now to FIG. 1A, the holographic object detection system 1 may include a sensor device 10 configured to sense or scan the surrounding of a venue of interest and provide scan data 15 as a sensed or scanned result and a video surveillance camera 20 configured to capture images of the surrounding of the venue and provide image data 25 as a captured result. In one embodiment, the scan data 15 and the image data 25 may be computed or processed to generate a scan image and a video image, respectively, in which objects of a venue can be identified, so that they may be compared by a processing device 30 to determine a holographic object (e.g., H1 of FIG. 1A).

As depicted, the sensor device 10 may generate and transmit an electromagnetic (EM) probe signal 11 toward the venue and receive an EM echo signal 12. It is illustrated for example only that the venue has three objects P1, P2, and H1. The EM echo signal 12 may be a signal generated as a result of the EM probe signal 11 being reflected by physical objects (e.g., P1 and P2) among the objects P1, P2, and H1. For example, if the EM echo signal 12 is detected with regard to a certain direction or location within the venue, the sensor device 10 may identify the existence of a physical object at the direction or location. In this disclosure, the objects P1 and P2 represent physical objects and the object H1 represents a holographic object.

In one embodiment, the EM probe signal 11 is provided as forms of EM radiations which include, but are not limited, at least one of: non-optical EM radiations such as sonic radiations, ultrasound (or ultrasonic) radiations, radio wave radiations, microwave radiations, millimeter wave radiations, optical EM radiations such as IR radiations, laser radiations, LED radiations, non-visible light radiations, visible light radiations, etc. The EM probe signal 11 is reflected by the physical objects P1 and P2 to generate the echo signal 12. On the other hand, the EM probe signal 11 does not generate the echo signal 12 for the holographic object H1 because the EM probe signal 11 only passes through the holographic object H1. The holographic object H1 can be identified within the video image (corresponding to the image data 25) captured using the video surveillance camera 20. For example, the holographic object H1 is captured by the video surveillance camera 20 along with the other physical objects P1 and P2, but is not identified by the sensor device 10.

Referring still to FIG. 1A, the holographic object detection system 1 further includes the processing device 30 configured to determine the holographic object H1 among the objects P1, P2, and H1 by comparing the scan data 15 (e.g., corresponding to scan image) and the image data (e.g., corresponding to video image).

Next, the scan data 15 and the image data 25 provided, respectively, by the sensor device 10 and the video surveillance camera 20 may be stored in a memory 40. The processing device 30 may further compute or process the scan data 15 to provide the scan image and the image data 25 to provide the video image. The processing device 30 may compare the scan image corresponding to the scan data 15 with the video image corresponding to the image data 25, determine the object H1 as a holographic object in response to determining that object H1 is identified in the video image (corresponding to the image data 25) and is not identified in the scan image, and determine other objects P1 and P2 as physical objects in response to determining that objects P1 and P2 are identified in both the video image and the scan image.

In one embodiment, the processing device 30 may further be configured to highlight the determined holographic object H1 in the video image with an appropriate tag so that the holographic object H1 can easily be distinguished from the other physical objects P1 and P2. Once the holographic object H1 is determined, the processing device 30 may further be configured to set a trigger causing a variety of actions/responses such as: locating and tracking (or monitoring) the holographic object H1 over time and space, locating sources (e.g., projection site) generating the holographic object H1, etc., for the purpose of establishing physical security of a monitored site or venue, supporting an augmented reality ecosystem by providing users with systems or means to deploy or control user's augmented reality, etc.

In one embodiment, the tracking of the holographic object H1 may include identifying human objects and/or non-human objects which are interacting with the highlighted holographic object H1 and identifying types of the interactions. The types of the interactions include: at least one physical object's touching, picking-up, and handling the holographic object H1; gaming using the object H1; or transferring information using the object H1, etc.

In one embodiment, the holographic object detection system 1 may further include at least one of a vapor generator (not shown), a mist generator (not shown), and a smoke generator (not shown) that diffuse at least one of vapor, mist, and smoke to the venue to trace a holographic projection beam(s) from the holographic object H1 to the source.

In one embodiment, the holographic object detection system 1 may further include a display device 50, a network adaptor 60, and a control device 80. The processing device 30 communicates with the memory 40, the display device 50, and the network adaptor 60 via a bus 70. The display device 50 may display the scan image (corresponding to the scan data 15), the video image (corresponding to the image data 25), and/or a combined image thereof. The network adaptor 60 may be used to provide various resulting data with regard to the above-mentioned actions/responses of the holographic object detection system 1 to other network systems or storages (not shown) via a network 90. Operations of the sensor device 10, the video surveillance camera device 20, the processing device 30, the memory 40, the display device 50, and the network adaptor 60 may be controlled by the control device 80.

The network 90 may be configured to support communications between the holographic object detection system 1 and the other network systems or the storages, and may be implemented based on wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, or the like.

Figure 1B:
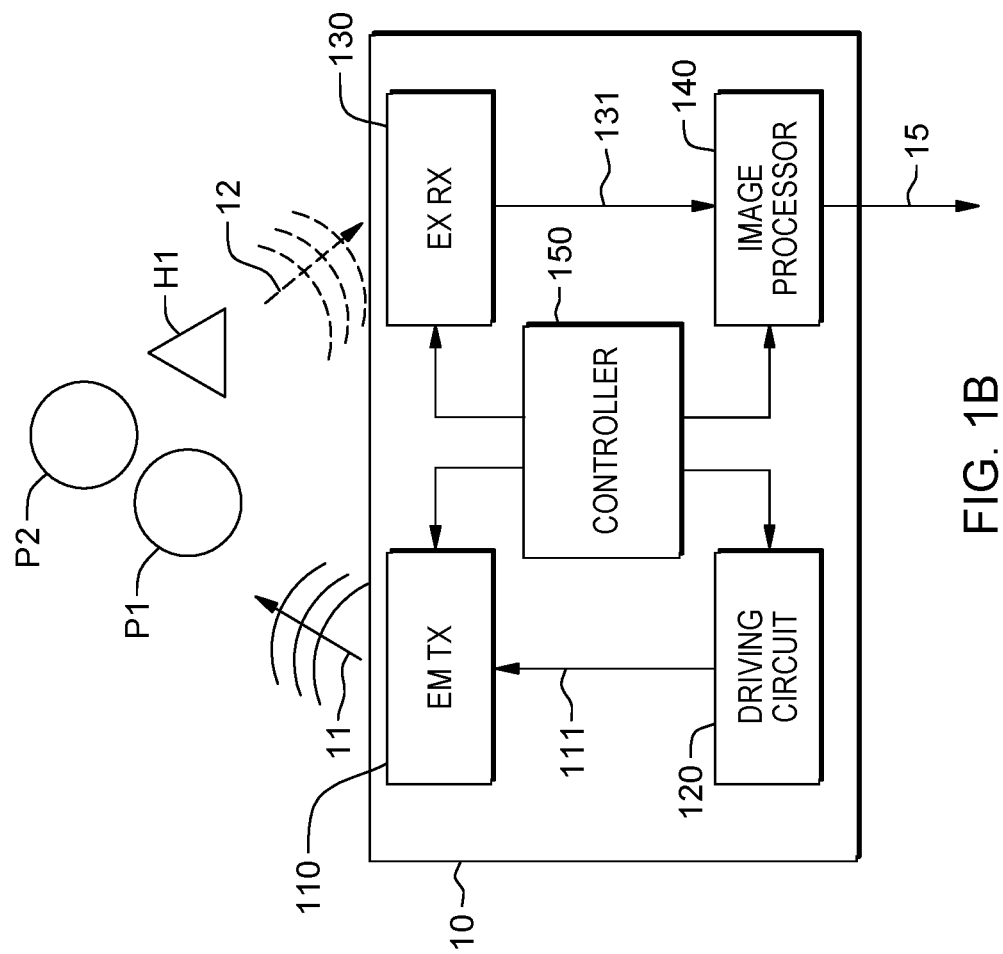
FIG. 1B is a block diagram of an example sensor device according to an embodiment of the present disclosure.

FIG. 1B is a block diagram of an example sensor device 10 according to an embodiment of the present disclosure.

As depicted in the example of FIG. 1B, the sensor device 10 may include an EM transmitter 110 and an EM receiver 130. The EM transmitter 110 may be driven by a driving pulse 111 provided from a pulse driving circuit 120, so that intensity of the EM probe signal 11 is modulated according to the driving pulse 111. The EM transmitter 110 may output and transmit the EM probe signal 11 toward the venue for a signal transmitting period. Characteristics (e.g., a duty ratio) of the driving pulse 111 may be adjusted under a control by a control device 150. The EM receiver 130 may receive an EM echo signal 12 reflected by the objects P1 and P2 for a signal receiving period. In some aspects, the signal transmitting period and the signal receiving period may be different.

Thus, the sensor device 10 may emit a pulsed EM probe signal 11. The EM probe signal 11 may propagate over the venue and strike the objects P1, P2, and H1. The EM probe signal 11 may be reflected by the physical objects P1 and P2 and the reflected EM probe signal 11 may be received to the EM receiver 130 as the EM echo signal 12. The EM receiver 130 may convert (e.g., demodulate) the EM echo signal 12 to a corresponding electrical signal 131. In one embodiment, a distance between the sensor device 10 and a certain object in a venue can be computed based a time difference between when the EM probe signal 11 is transmitted and when the EM echo signal 12 is received. In one embodiment, the electrical signal 131 may further processed or computed by an image processor 140 to generate the scan data 15. The scan data 15 allows identifying of the objects P1 and P2 in the venue in terms of, e.g., location and shapes.

In another embodiment, the sensor device 10 may transmit light toward the venue to cast shadows of the objects in the venue. In this particular embodiment, the EM probe signal 11 may be the light transmitted toward the venue to cast the shadows of the objects. Given that the shadows occur when light is blocked by an obstacle at a light path, the physical objects P1 and P2 can cast their own shadows. On the other hand, the holographic object H1 which does not block the light (rather pass it) cannot cast any shadow. As described above, the light may be understood to mean any optical EM radiations capable of casting shadows of objects. For example, the light may be visible light or nonvisible light (e.g., IR). In this case, the video surveillance camera device 20 may further include a light detection module adapted to the wavelength of the light.

Figure 2:
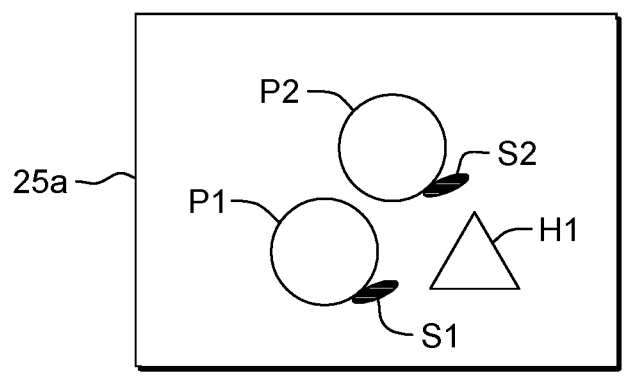
FIG. 2 is an example video image showing physical objects having shadows and a holographic object having no shadow according to an embodiment of the present disclosure.

Referring now to FIG. 2, an example video image 25a showing physical objects P1 and P2 having shadows S1 and S2 and a holographic object H1 having no shadow is shown. The video image 25a captured using the video surveillance camera device 20 may be provided to the processing device 30. The processing device 30 may analyze the video image 25a, determine the objects P1 and P2 having their own shadows S1 and S2 as physical objects, and determine the object H1 having no shadow as a holographic object.

Figure 3:
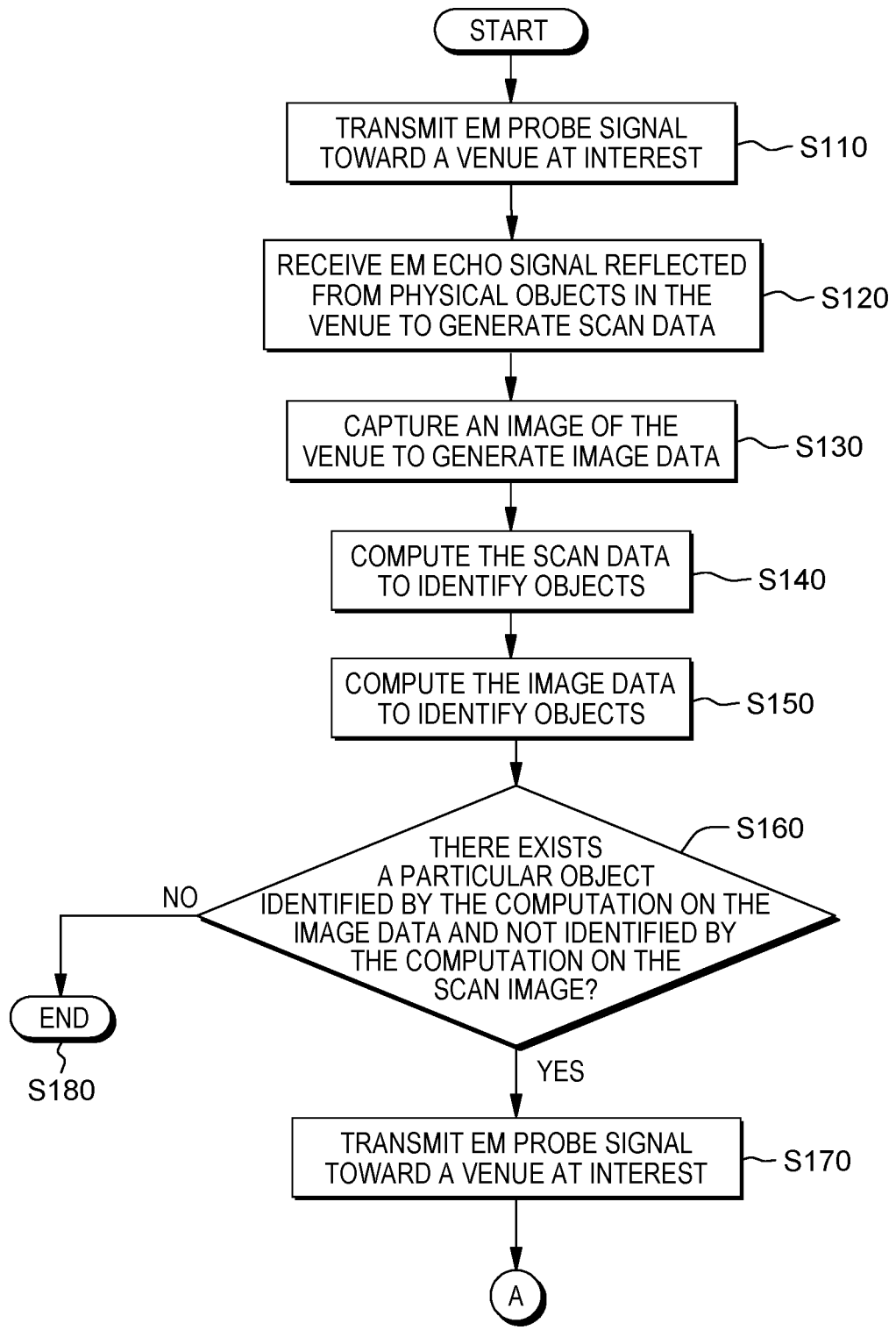
FIG. 3 is an example flow chart depicting a method for detecting and tracking a holographic object according to an embodiment of the present disclosure.
Figure 4:
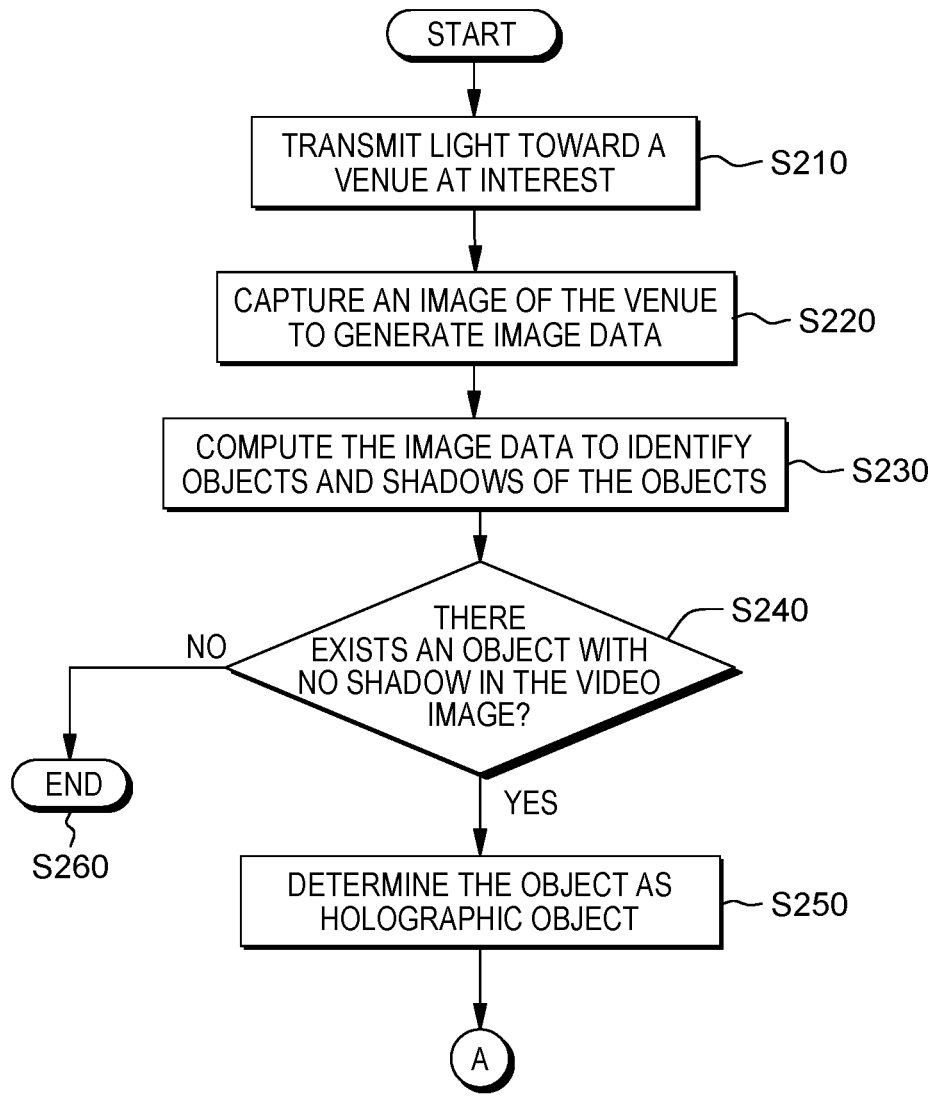
FIG. 4 is an example flow chart depicting a method for detecting and tracking a holographic object according to an embodiment of the present disclosure.

FIG. 3 is an example flow chart depicting a method for detecting and tracking a holographic object according to an embodiment of the present disclosure. FIG. 4 is an example flow chart depicting a method for detecting and tracking a holographic object according to an embodiment of the present disclosure.

Referring to the example depicted in FIGS. 1A and 1B, the method may include steps S110 to S180.

At S110, the sensor device 10 (e.g., the EM transmitter 110 of FIG. 1B) may transmit the EM probe signal 11 toward the venue including the objects P1, P2, and H1. Next, the sensor device 10 (e.g., the EM receiver 130 of FIG. 1B) may receive the EM echo signal 12 which is reflected by the objects (e.g., physical objects P1 and P2) in the venue to generate the scan data 15 (S120). The video surveillance camera device 20 may capture one or more images of the venue to generate the image data 25 (S130). The processing device 30 may compute the scan data 15 to identify the objects P1, P2, and H1 (S140) and compute the image data 25 to identify the objects P1, P2, and H1 (S150). For example, the computing the scan data 15 and the image data 25 to identify the objects P1, P2, and H1 in the steps S140 and S150 may include generating a scan image and a video image, respectively, based on the scan data 15 and the image data 25. The processing device 30 may compare the computation results on the scan data 15 and the image data 25 to determine whether there exists a particular object (e.g., H1) of the objects (e.g., P1, P2, and H1) which is identified by the computation on the image data 25 and is not identified by the computation on the scan data 15 (S160). As one example of the step S160, the processing device 30 may compare a video image generated by the computation on the image data 25 and a scan image generated by the computation on the scan data 15 to determine whether there exists a particular object (e.g., H1) of the objects (e.g., P1, P2, and H1) which is identified in the video image and is not identified in the scan image. If it is determined to be YES in the step S160, the processing device 30 may determine the particular object as a holographic object (S170) and the method may move to the block A described with reference with FIG. 5. In addition, if it is determined to be NO in the step S160, the method ends (S180).

FIG. 4 is an example flow chart depicting a method for detecting and tracking a holographic object according to an embodiment of the present disclosure.

Referring to the example depicted in FIGS. 1A and 1B, the method may include steps S210 to S260.

At S210, there is transmitted a light signal for casting shadows of the objects (e.g., P1 and P2) toward the venue of interest. Next, the video surveillance camera device 20 may capture an image of the venue to generate image data 25 (S220). The processing device 30 may compute the image data 25 to identify the objects and shadows of the objects (S230). As one example of the step S230, the processing device 30 may generate a video image based on the image data 25. Next, the processing device 30 may determine whether there exists a particular object with no shadow based on the computation on the image data 25 (S240). As one example of the step S240, the processing device 30 may determine whether there exists a particular object with no shadow in the video image. If it is determined to be YES in the step S240, the processing device 30 may determine the particular object as a holographic object (S250) and the method may move to the block A described with reference with FIG. 5. In addition, if it is determined to be NO in the step S240, the method ends (S260).

Figure 5:
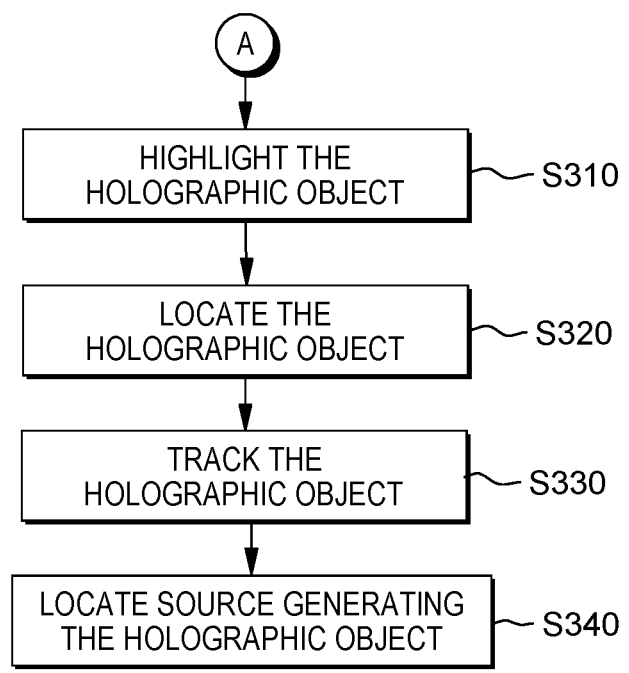
FIG. 5 depicts an example flow chart of steps performed after the step S170 of FIG. 3 and the step S250 of FIG. 4 according to an embodiment of the present disclosure.

FIG. 5 depicts an example flow chart of steps performed after the step S170 of FIG. 3 and the step S250 of FIG. 4 according to an embodiment of the present disclosure.

As depicted in the example of FIG. 5, after the step S170 of FIG. 3 or the step S250 of FIG. 4, the method may further include steps S310 to S340.

At S310, the processing device 30 may further highlight, in the video image, the determined holographic object (e.g., H1) with an appropriate tag, locate the holographic object (S320), track or monitor the holographic object over time and space (S330), and/or locate a source generating the holographic object (S340). In some embodiments, the video image where the holographic object is highlighted may be shown in the display device 50.

Figure 6:
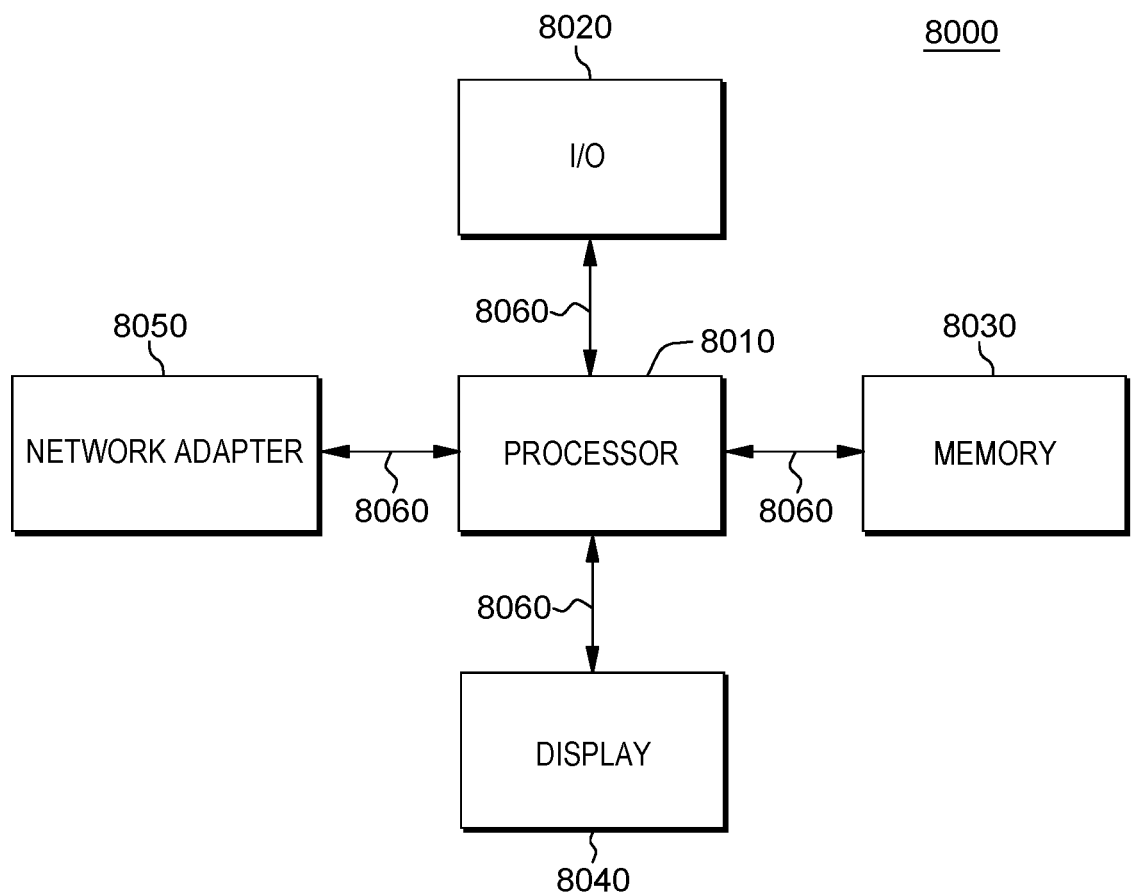
FIG. 6 is a block diagram of a computing system according to an embodiment of the present disclosure.

FIG. 6 is a block diagram of a computing system 8000 according to an exemplary embodiment of the present disclosure.

Referring to the example depicted in FIG. 6, a computing system 8000 may be used (without limitation) as a platform for performing (or controlling) the functions or operations described hereinabove with respect to the holographic object detection system 1 of FIG. 1A and the sensor device 10 of FIG. 1B, and/or methods of FIGS. 3-5.

In addition (without limitation), the computing system 8000 may be implemented with an UMPC, a net-book, a PDA, a portable computer, a web tablet, a wireless phone, a mobile phone, a smart phone, an e-book, a PMP, a portable game console, a navigation device, a black box, a digital camera, a DMB player, a digital audio recorder, a digital audio player, a digital picture recorder, a digital picture player, a digital video recorder, a digital video player, or the like.

Referring now specifically to FIG. 6, the computing system 8000 may include a processor 8010, I/O devices 8020, a memory system 8030, a display device 8040, bus 8060, and a network adaptor 8050.

The processor 8010 is operably coupled to and may communicate with and/or drive the I/O devices 8020, the memory system 8030, the display device 8040, and the network adaptor 8050 through the bus 8060.

The computing system 8000 can communicate with one or more external devices using network adapter 8050. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The computing system 8000 may also include or access a variety of computing system readable media. Such media may be any available media that is accessible (locally or remotely) by a computing system (e.g., the computing system 8000), and it may include both volatile and non-volatile media, removable and non-removable media.

The memory system 8030 can include computer system readable media in the form of volatile memory, such as random access memory (RAM) and/or cache memory or others. The computing system 8000 may further include other removable/non-removable, volatile/non-volatile computer system storage media.

The memory system 8030 may include a program module (not shown) for performing (or controlling) the functions or operations described hereinabove with respect to the holographic object detection system 1 of FIG. 1A and the sensor device 10 of FIG. 1B, and/or methods of FIGS. 3-5 according to exemplary embodiments. For example, the program module may include routines, programs, objects, components, logic, data structures, or the like, for performing particular tasks or implement particular abstract data types. The processor (e.g., 8010) of the computing system 8000 may execute instructions written in the program module to perform (or control) the functions or operations described hereinabove with respect to the holographic object detection system 1 of FIG. 1A and the sensor device 10 of FIG. 1B, and/or methods of FIGS. 3-5. The program module may be programmed into the integrated circuits of the processor (e.g., 8010). In some embodiments, the program module may be distributed among memory system 8030 and one or more remote computer system memories (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A computer-implemented method for detecting a virtual object, comprising:
   transmitting a probe signal to objects;
   receiving an echo signal reflected by at least one object of the objects;
   generating scan data based on the echo signal;
   capturing one or more images of the objects;
   generating image data corresponding to the captured images;
   computing the scan data to identify each of the objects;
   computing the image data to identify each of the objects;
   determining a first object of the objects as a virtual object, responsive to determining that the first object is identified by the computation on the image data and is not identified by the computation on the scan data; and in response to determining the first object as the virtual object, highlighting in a display device, the determined virtual object with a corresponding tag, and tracking or monitoring the virtual object over time and space.

2. The computer-implemented method of claim 1, further comprising:

determining a second object of the objects as a virtual object, responsive to determining that the second object has no shadow by the computation on the image data.

3. The computer-implemented method of claim 1, further comprising:

determining the at least one object as a physical object, responsive to determining at least one of: that the at least one object is identified by the computation on the image data and is identified by the computation on the scan data.

4. The computer-implemented method of claim 1, further comprising:

determining the at least one object as a physical object, responsive to determining that the at least one object has a shadow by the computation on the image data.

5. The computer-implemented method of claim 1, further comprising:

identifying at least one physical object of the objects interacting with the determined virtual object; and identifying types of the interactions of the at least one physical object with the virtual object.

6. The computer-implemented method of claim 5, wherein the types of the interactions comprise:

the at least one physical object touching or picking-up the virtual object.

7. The computer-implemented method of claim 1, wherein the probe signal has a wavelength band corresponding to at least one of a sonic radiation, an ultrasonic radiation, visible light, and invisible light.

8. The computer-implemented method of claim 1, further comprising:

determining a location of a source generating the virtual object.

9. A system for detecting a virtual object, comprising:

a sensor device configured to transmit a probe signal to objects, receive an echo signal reflected by at least one object of the objects, and generate scan data based on the echo signal;

an image capturing device configured to capture one or more images of the objects and generate image data corresponding to the captured images;

a processing device; and a memory device coupled to the processing device, wherein the processing device is configured to:

receive the scan data and compute the scan data to identify each of the objects;

receive the image data and compute the image data to identify each of the objects; and determine a first object of the objects as a virtual object, responsive to determining that the first object is identified by the computation on the image data and is not identified by the computation on the scan data; and in response to determining the first object as the virtual object, highlight in a display device, the determined virtual object with a corresponding tag, and track or monitor the virtual object over time and space.

10. The system of claim 9, wherein the processing device is further configured to: determine a second object of the objects as a virtual object, responsive to determining that the second object has no shadow by the computation on the image data.

11. The system of claim 9, wherein the processing device is further configured to:

identify at least one physical object of the objects interacting with the determined virtual object; and identify types of the interactions of the at least one physical object with the virtual object.

12. The system of claim 11, wherein the types of the interactions comprise:

the at least one physical object touching or picking-up the virtual object.

13. The system of claim 9, wherein the probe signal has a wavelength band corresponding to at least one of a sonic radiation, an ultrasonic radiation, visible light, and invisible light.

14. A computer program product comprising a computer-readable storage medium having computer readable program instructions embodied therewith, the computer readable program instructions executable by at least one processor to cause a computer to perform method for detecting a virtual object, comprising:

transmitting a probe signal to objects;

receiving an echo signal reflected by at least one object of the objects;

generating scan data based on the echo signal;

capturing one or more images of the objects;

generating image data corresponding to the captured images;

computing the scan data to identify each of the objects;

computing the image data to identify each of the objects;

determining a first object of the objects as a virtual object, responsive to determining that the first object is identified by the computation on the image data and is not identified by the computation on the scan data; and in response to determining the first object as the virtual object, highlighting in a display device, the determined virtual object with a corresponding tag, and tracking or monitoring the virtual object over time and space.

15. The computer program product of claim 14, wherein the method further comprises:

determining a second object of the objects as a virtual object, responsive to determining that the second object has no shadow by the computation on the image data.

16. The computer program product of claim 14, further comprising:

identifying at least one physical object of the objects interacting with the determined virtual object; and identifying types of the interactions of the at least one physical object with the virtual object.

17. The computer program product of claim 14, wherein the probe signal has a wavelength band corresponding to at least one of a sonic radiation, an ultrasonic radiation, visible light, and invisible light.

* * * * *